(12) United States Patent
Voelker et al.

(10) Patent No.: US 11,724,303 B2
(45) Date of Patent: Aug. 15, 2023

(54) METHOD FOR PRODUCING A HEAT EXCHANGER

(71) Applicant: Mahle International GmbH, Stuttgart (DE)

(72) Inventors: Cord Voelker, Backnang (DE); Matthias Goerdeler, Stuttgart (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/552,558

(22) Filed: Dec. 16, 2021

(65) Prior Publication Data

US 2022/0250136 A1 Aug. 11, 2022

(30) Foreign Application Priority Data

Dec. 16, 2020 (DE) .................. 10 2020 216 059.7

(51) Int. Cl.
| | |
|---|---|
| *B21D 53/06* | (2006.01) |
| *B23K 1/00* | (2006.01) |
| *B21D 53/02* | (2006.01) |
| *B23K 101/14* | (2006.01) |
| *B23K 103/10* | (2006.01) |

(52) U.S. Cl.
CPC .......... *B21D 53/06* (2013.01); *B21D 53/022* (2013.01); *B23K 1/0008* (2013.01); *B23K 2101/14* (2018.08); *B23K 2103/10* (2018.08)

(58) Field of Classification Search
CPC .. F28D 1/053; F28D 1/05316; F28D 1/05325; F28D 1/0535; F28D 1/05366; F28D 1/05383; F28D 1/06; B21D 53/06; B21D 53/08; B21D 39/06; B23K 1/0012; B23K 2101/14; B23P 15/26; Y10T 29/49375; Y10T 29/49373; Y10T 29/49389; Y10T 29/49364
See application file for complete search history.

(56) References Cited

U.S. PATENT DOCUMENTS

| | | | | |
|---|---|---|---|---|
| 3,349,465 A | * | 10/1967 | La Pan | F22G 3/009 228/183 |
| 3,458,917 A | | 8/1969 | Mueller | |
| 3,822,742 A | * | 7/1974 | Stowell | F28F 3/14 165/170 |
| 4,727,635 A | * | 3/1988 | Krips | B23K 9/0288 29/523 |
| 4,799,540 A | * | 1/1989 | Pietzcker | B21D 53/085 165/181 |

(Continued)

FOREIGN PATENT DOCUMENTS

| | | |
|---|---|---|
| DE | 37 21 257 A1 | 1/1989 |
| DE | 10 2010 048 406 A1 | 2/2012 |

OTHER PUBLICATIONS

English abstract for DE-10 2010 048 406.
German Search Report for DE-102020216059.7, dated Aug. 20, 2021.

*Primary Examiner* — Jason L Vaughan
(74) *Attorney, Agent, or Firm* — Fishman Stewart PLLC

(57) ABSTRACT

A method for producing a heat exchanger having tubes that are each received at a longitudinal end side in an associated header, the tubes and the headers are formed out of aluminium. The method may include soldering the tubes and the headers to one another to form a coolant-conducting channel structure, and cold-forming the heat exchanger following the soldering of the tubes to the headers such that strength is thereby increased.

18 Claims, 1 Drawing Sheet

(56) References Cited

U.S. PATENT DOCUMENTS

| | | | | |
|---|---|---|---|---|
| 5,036,913 | A * | 8/1991 | Murphy | B23K 31/02 |
| | | | | 228/183 |
| 5,097,590 | A * | 3/1992 | Tokura | B21D 53/085 |
| | | | | 29/890.044 |
| 5,101,561 | A * | 4/1992 | Fuhrmann | B21D 39/20 |
| | | | | 29/890.044 |
| 5,505,256 | A * | 4/1996 | Boardman | B21D 53/045 |
| | | | | 165/166 |
| 5,898,996 | A * | 5/1999 | Buchanan | F28F 9/0243 |
| | | | | 29/890.052 |
| 6,082,353 | A * | 7/2000 | van Doorn | F24S 10/753 |
| | | | | 29/890.036 |
| 6,357,114 | B1 * | 3/2002 | Tang | B23P 9/00 |
| | | | | 29/890.044 |
| 6,722,009 | B2 * | 4/2004 | Kojima | B21D 26/021 |
| | | | | 29/890.044 |
| 7,500,515 | B2 * | 3/2009 | Tsuji | F28F 1/32 |
| | | | | 29/890.044 |
| 9,669,455 | B2 * | 6/2017 | Boisselle | B23P 15/26 |
| 2006/0196650 | A1 * | 9/2006 | Filippi | F28D 9/0031 |
| | | | | 29/890.044 |
| 2008/0087408 | A1 * | 4/2008 | Maezawa | F28F 1/32 |
| | | | | 165/151 |
| 2011/0030932 | A1 * | 2/2011 | Tucker | F28F 1/32 |
| | | | | 29/890.047 |

* cited by examiner

METHOD FOR PRODUCING A HEAT EXCHANGER

This application claims priority to German Application No. DE 102020216059.7 filed on Dec. 16, 2020, the contents of which are hereby incorporated by reference in its entirety.

TECHNICAL FIELD

The present invention relates to a method for producing a heat exchanger having tubes which are each received at a longitudinal end side in an associated header according to the preamble of claim 1. In addition, the invention relates to a heat exchanger produced according to this method.

BACKGROUND

From DE 10 2010 048 406 A1 a method for drawing plates by means of a drawing device including a tool upper part, a tool lower part, preferentially punch and die, and sheet holder is known, wherein the sheet to be drawn is held by clamping in the edge region by the sheet holders and wherein for obtaining the necessary strength/thickness of the component to be drawn a minimum of work hardening is brought about by way of plastic elongation. In the process, the sheet holders pivot to the outside during the working stroke of the tool, i.e., away from the actual drawing tool and in the process stretch the sheet and mount the same over one of the tool parts, preferentially over the punch.

Aluminium heat exchangers are widely used in the automotive industry for cooling and air-conditioning vehicles. Typically, the individual aluminium parts of the aluminium heat exchangers are connected to one another by soldering. Here, the soldering can take place through all technically practical methods such as for example in a continuous or batch furnace but also by way of inductive heating, radiation heating, contact heating, etc. In all cases, the soldering results in the disadvantage that the material after the soldering process is present in a soft state. Thus, the materials employed have their minimal strength.

Known heat exchangers are usually constructed out of tubes, in particular out of flat tubes and headers. When the two components are being soldered together, i.e. for example when the tubes are soldered to the headers, a channel structure for coolant is formed, which in the operating state is cooled by air flowing transversely thereto.

Primarily it is attempted here to improve the strength after the soldering by way of hardenable aluminium alloys, wherein there is a severe limitation in terms of the aluminium alloys that can be used, that are solderable and also hardenable. It is difficult, furthermore, to achieve the partly high cooling gradients after the soldering, so that a strength increase through natural or artificial ageing materialises in the first place.

The present invention therefore deals with the problem of stating for a method of the generic type an improved or at least an alternative embodiment which in particular overcomes the disadvantages known from the prior art.

According to the invention, this problem is solved through the subject of the independent claim 1. Advantageous embodiments are subject of the dependent claims.

SUMMARY

The present invention is based on the general idea of improving a method known to date for producing heat exchangers out of aluminium, for example for electric vehicles in that the heat exchanger, following a soldering of its individual tubes to the headers is cold-formed once more, for example, stretched, as a result of which in particular the strength reduced for example by a soldering process can be significantly increased. With the method according to the invention for producing a heat exchanger, tubes are each initially inserted at the longitudinal end side into an associated header and soldered to one another, as a result of which a coolant-conducting channel structure is formed. According to the invention, the heat exchanger is now cold-formed after the soldering of the tubes to the headers, as a result of which the strength can be increased. Through the increased strength, the heat exchanger produced according to the invention is less sensitive during the further production or assembly. By the forming it is additionally possible to cool the heat exchanger more rapidly after a soldering process, as a result of which the potential of the useable aluminium alloys for the hardening can be increased. The increased strength in turn has the consequence that the thickness of the tubes or of the headers can be correspondingly reduced, as a result of which a weight, resource and cost saving as well as an improved cooling output can be achieved.

In an advantageous further development of the solution according to the invention, the heat exchanger, after the soldering of the tubes to the headers, is stretched, i.e. elongated by approximately 0.1 to 10%, preferentially by approximately 1 to 3%. By way of the stretching or elongating, in particular distortions or corrugations after the soldering can also be eliminated. A further substantial advantage of the cold stretching is that, depending on the degree of forming employed during the cold stretching, the material strength increases, i.e. the heat exchangers can be improved with respect to strength and stiffness. With a stretching of the heat exchangers between 1 and 10%, a strength increase of up to 100% can materialise depending on the aluminium alloy used.

In an advantageous further development of the solution according to the invention, the heat exchanger, after the tubes have been soldered to the headers, defines an x-y-plane and is stretched in the x-direction and/or in the y-direction, i.e. elongated. Here it is conceivable that a stretching in the y-direction (transversely to the tube longitudinal axis) exclusively takes place in particular when the tubes are connected to one another by way of heat exchanger elements arranged in between.

Besides the actual elongating, i.e. stretching of the heat exchanger, further cold-forming methods can obviously also be employed in addition or alternatively, wherein "cold" is to merely mean the forming below the recrystallization temperature of aluminium. By way of the described cold-forming methods, a work hardening and thus also an increase of the material strength occur. Further cold-forming methods can be for example bending, drawing, hammering, twisting, high-pressure internal forming or shot-peening. With all cold-forming methods merely described exemplarily here, dislocations and internal stresses occur in the cold-formed material which, besides increasing the hardness and the yield point, can also lead to changed other properties, for example electrical and magnetic properties. By way of the cold-forming, not only the strength can be increased but, by way of the increased strength, the further processing of the heat exchangers can be significantly simplified at the same time, since these are sturdier.

Practically, after the tubes have been soldered to the headers and prior to the cold-forming, the heat exchanger is cooled with a cooling rate of >15 K/min, in particular greater than 40 K/min, preferably 40-100 K/min, in the temperature range 570-200° C. By way of the faster cooling, an improved hardening of the aluminium alloy and thus a higher strength of the same can in turn be achieved. For a subsequent cold or warm hardening of hardenable aluminium alloys, cooling rates in the temperature range between 570-200° C. should amount to at least 15 K/min, in particular at least 40 K/min. Cooling gradients of approximately 100 K/m in are better as a result of which optimum prerequisites for a subsequent cold or warm hardening are created and the strength increased by stretching is optimised. In an advantageous further development of the solution according to the invention, the tube and/or the headers have/has a wall thickness d of 0.2 mm<d<1.5 mm. In order to be able to achieve the same strength of the heat exchangers, for example in terms of the pressure stability, it is possible because of the increased strength achieved by the cold-forming, to reduce the wall thicknesses for example by 20-50%, as a result of which a considerable resource, cost and weight advantage can be achieved.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components. It shows, in each case schematically,

DETAILED DESCRIPTION

Figure 1:
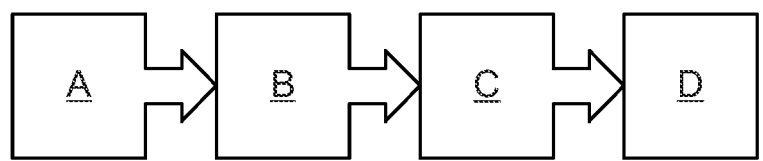
FIG. 1 a possible sequence of a method according to the invention for producing a heat exchanger, FIG. 2 a view of a heat exchanger according to the invention produced in accordance with a method according to the invention.
Figure 2:
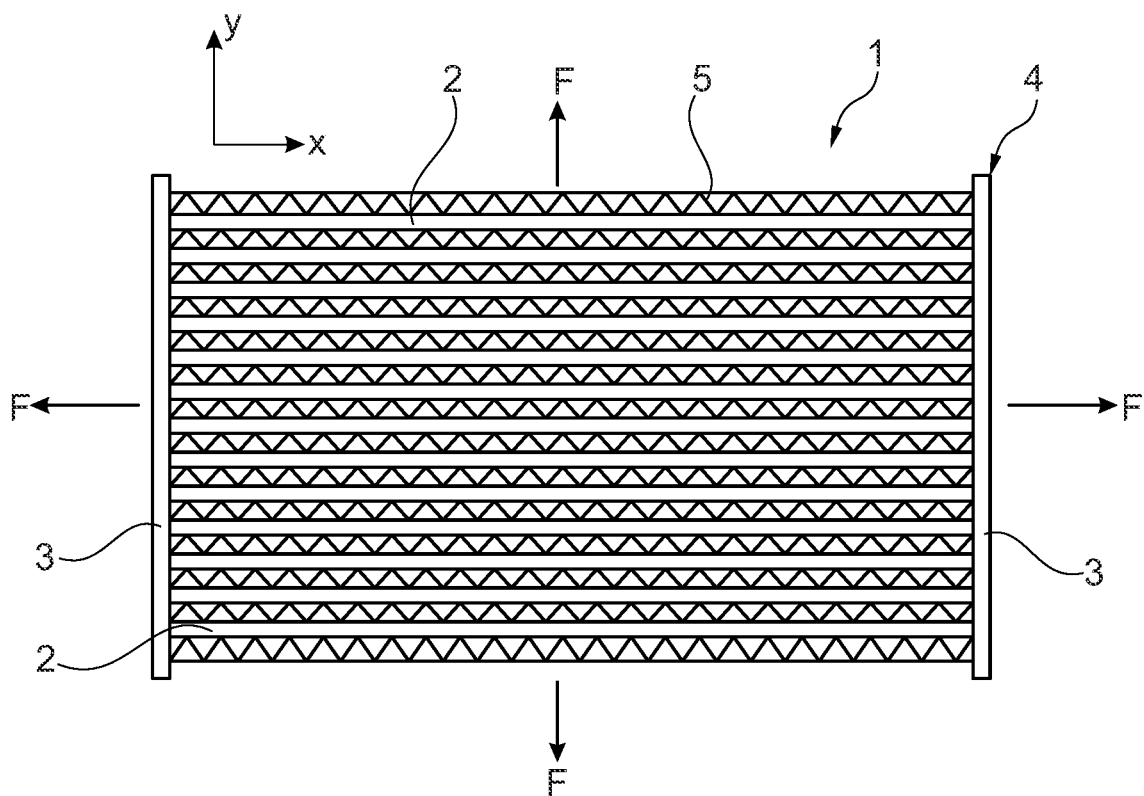

According to FIG. 1, tubes 2 and two headers 3 are initially provided in a method according to the invention for producing a heat exchanger 1 (see also FIG. 2). This can take place for example in the method step A. Following this, the tubes 2 are each inserted at the longitudinal end side into openings (passages) of the headers 3, wherein both the tubes 2 and also the headers 3 are formed out of aluminium. The tubes 2 and the headers 3 are soldered to one another and, in an interconnected state, form a coolant-conducting channel structure 4. This can take place for example in the method step B. Following the establishment of the soldered connection, the heat exchanger 1 is cold-formed in the method step C, as a result of which the strength of the heat exchanger 1 is increased. Following the cold-forming, the heat exchanger 1 is completed in the method step D.

Here, the tubes 2 can be designed as flat tubes and be produced for example by the extrusion moulding method.

By the cold-forming in the method step C, the strength of the aluminium can be significantly increased as a result of which the heat exchanger 1 is sturdier and need no longer be handled so carefully in a further production or assembly step. Through the higher strength by way of the cold-forming an increased pressure stability can be additionally achieved, as a result of which the use of reduced wall thicknesses both of the tubes 2 and also of the headers 3 is possible. By way of this, resources, costs and weight can be saved.

The cold-forming can take place for example by a stretching, so that the heat exchanger 1 following the soldering of the tubes 2 to the headers 3 is stretched, i.e. elongated by approximately 0.1% to 10%. Preferentially, an elongation here amounts to approximately 1% to 3%.

According to FIG. 2 such a stretching process is shown, wherein in this case suitable forces F act on all four sides or edges of the heat exchanger 1 and bring about the stretching of the heat exchanger 1 and thus the strength increase of the same.

Viewing FIG. 2 further it is noticeable that the heat exchanger 1, after the soldering of the tubes 2 to the headers 3, defines an x-y-plane and a stretching takes place in the x-direction and/or in the y-direction. A stretching transversely to the x-y-plane, i.e. perpendicularly to the image plane, is not provided.

A cold-forming of the heat exchanger 1 after the establishment of the soldered connection between the tubes 2 and the headers 3 can additionally or alternatively to the stretching also take place by a hammering, rolling, high-pressure internal forming or stamping. Merely a transforming of the crystal structure, increasing the strength of the heat exchanger 1 is important here.

Between the individual tubes 2, heat exchanger elements 5, for example corrugated fins, can be additionally provided, which, together with the tubes 2 and the headers 3, are soldered together and subsequently stretched.

Practically, after the soldering of the tubes 2 to the headers 3 and still prior to the cold-forming, i.e. for example prior to the stretching, the heat exchanger 1 is cooled with a cooling rate of at least 15 K/min, in particular at least 40 K/m in, preferentially 40 to 100 K/m in in the temperature range 570-200° C. Through the subsequent cold-forming, the heat exchanger 1, after the soldered connection has been established, can be cooled more rapidly as a result of which an improved hardening and thus likewise a strength increase can be achieved. Through the increased strength, not only can the lifespan of the heat exchanger 1 be increased but, with the same required strength, a wall thickness of the tubes 2 and/or of the headers 3 can also be reduced so that compared with previous heat exchangers a reduction of the wall thickness by 20-50% is possible. During the cold-forming, for example during the stretching, a strength increase, depending on the aluminium alloy, of up to 100% can materialise, so that in this case a reduction of the wall thickness by 50% would be conceivable.

With the method according to the invention, a heat exchanger 1 according to the invention, for example for an electric vehicle, can thus be created which can be produced more rapidly, with lower weight, with same strength or higher strength with same weight.

The invention claimed is:

1. A method for producing a heat exchanger having tubes that are each received at a longitudinal end side in an associated header, the tubes and the headers are formed out of aluminium, the method comprising:
    soldering the tubes and the headers to one another to form a coolant-conducting channel structure; and
    cold-forming the heat exchanger following the soldering of the tubes to the headers;

wherein the heat exchanger following the soldering of the tubes to the headers is stretched by approximately 0.1% to 10%; and the heat exchanger, following the soldering of the tubes to the headers and prior to the stretching, is cooled with a cooling rate of approximately 15-100 K/min, in a temperature range of approximately 570-200° C.

2. The method according to claim 1, wherein the heat exchanger following the soldering of the tubes to the headers is stretched by approximately 1% to 3%.

3. The method according to claim 1, wherein the heat exchanger following the soldering of the tubes to the headers defines an x-y-plane and is stretched in a x-direction and/or in a y-direction.

4. The method according to claim 1, wherein the heat exchanger following the soldering of the tubes to the headers is hammered, rolled, stamped or pressurized.

5. The method according to claim 1, wherein the tubes are formed as flat tubes.

6. A heat exchanger, wherein the heat exchanged is produced according to the method of claim 1.

7. The method according to claim 1, wherein the heat exchanger following the soldering of the tubes to the headers is hammered.

8. The method according to claim 1, wherein the heat exchanger following the soldering of the tubes to the headers is rolled.

9. The method according to claim 1, wherein the heat exchanger following the soldering of the tubes to the headers is stamped.

10. The method according to claim 1, wherein the heat exchanger following the soldering of the tubes to the headers is pressurised pressurized.

11. A method for producing a heat exchanger having tubes that are each received at a longitudinal end side in an associated header, the tubes and the headers are formed out of aluminium, the method comprising:

soldering the tubes and the headers to one another to form a coolant-conducting channel structure; and cold-forming the heat exchanger following the soldering of the tubes to the headers;

wherein disposed between the individual tubes are heat exchanger elements that together with the tubes and the headers are soldered and subsequently stretched.

12. The method according to claim 11, wherein the heat exchanger, following the soldering of the tubes to the headers and prior to the stretching, is cooled with a cooling rate of approximately 40-100 K/min, in a temperature range 570-200° C.

13. The method according to claim 11, wherein the heat exchanger elements include corrugated fins.

14. A method for producing a heat exchanger, the method comprising:

soldering at least one tube and at least one header to one another to form a coolant-conducting channel structure;

cold-forming the heat exchanger following the soldering of the at least one tube to the at least one header; and stretching the heat exchanger;

wherein disposed between the individual tubes are heat exchanger elements that together with the tubes and the headers are soldered and subsequently stretched.

15. The method according to claim 14, wherein the heat exchanger following the soldering of the at least one tube to the at least one header is stretched by approximately 0.1% to 10%.

16. The method according to claim 14, wherein the heat exchanger following the soldering of the at least one tube to the at least one header is stretched by approximately 1% to 3%.

17. The method according to claim 14, wherein the heat exchanger following the soldering of the at least one tube to the at least one header defines an x-y-plane and is stretched in a x-direction and/or in a y-direction.

18. The method according to claim 14, wherein the heat exchanger following the soldering of the at least one tube to the at least one header is hammered, rolled, stamped, or pressurized.

* * * * *